United States Patent
Ishida

[11] Patent Number: 6,160,042
[45] Date of Patent: Dec. 12, 2000

[54] SURFACE TREATED BORON NITRIDE FOR FORMING A LOW VISCOSITY HIGH THERMAL CONDUCTIVITY POLYMER BASED BORON NITRIDE COMPOSITION AND METHOD

[75] Inventor: Hatsuo Ishida, Shaker Heights, Ohio

[73] Assignee: Edison Polymer Innovation Corporation, Akron, Ohio

[21] Appl. No.: 09/164,927

[22] Filed: Oct. 1, 1998

Related U.S. Application Data

[63] Continuation-in-part of application No. 08/846,457, May 1, 1997, Pat. No. 5,900,447.
[51] Int. Cl.[7] .............................. C08K 9/04; C08K 3/38; C08L 63/00; C01B 21/064
[52] U.S. Cl. ...................... 523/445; 523/208; 523/415; 524/404; 428/703; 423/290
[58] Field of Search ....................... 523/208, 415, 523/445; 428/703; 423/290; 524/404

[56] References Cited

U.S. PATENT DOCUMENTS

| | | | |
|---|---|---|---|
| 5,152,939 | 10/1992 | Ishida | 264/29.1 |
| 5,221,783 | 6/1993 | Huynh et al. | 524/701 |
| 5,385,989 | 1/1995 | Obya | 525/502 |

*Primary Examiner*—Tae Yoon
*Attorney, Agent, or Firm*—Anderson, Kill & Olick P.C.

[57] ABSTRACT

A low viscosity high thermal conductivity polymer-based boron nitride composition and a surface-treated boron nitride material for use as a filler in this composition, and methods of preparation is described.

8 Claims, 1 Drawing Sheet

Viscosity at 100 °C of a 30 wt% boron nitride filled BA-a benzoxazine monomer. (● - untreated boron nitride, ■ - treated boron nitride)

SURFACE TREATED BORON NITRIDE FOR FORMING A LOW VISCOSITY HIGH THERMAL CONDUCTIVITY POLYMER BASED BORON NITRIDE COMPOSITION AND METHOD

FIELD OF THE INVENTION

The present invention is a continuation in part of patent application Ser. No. 08/846,457 filed May 1, 1997, now U.S. Pat. No. 5,900,447, the disclosure of which is herein incorporated by reference, and relates more particularly to a method of forming a low viscosity high thermal conductivity polymer based boron nitride composition and to a surface treated boron nitride material for use as a filler in forming a low viscosity high thermal conductivity polymer based boron nitride composite composition.

BACKGROUND OF INVENTION

Molding compositions are useful in the electronics industry to encapsulate electrical components such as integrated circuit devices so as to protect them from electrical and environmental damage. Some of the essential features needed for current electronic packaging materials include low coefficient of thermal expansion, high thermal conductivity, low dielectric constant, low water absorption and low viscosity. If the thermal conductivity of the material composition is too low the encapsulant may itself be detrimental in that it may act as a heat barrier and cause the temperature of the electrical components to rise above the temperature reliability specifications for the components which, in turn, may shorten the useful life of the encapsulated electrical components particularly for components such as semiconductors.

The heat dissipation problem in microelectronics is becoming increasingly important as the demands for denser and faster circuits intensify. Polymer compounds having a high thermal conductivity are also useful for other products such as computer cases, battery cases, electronic controller housings and for other encasements where heat removal is an important consideration.

Applicant's parent patent application Ser. No. 08/846,457 discloses a composite polymer based material possessing the characteristics of low thermal expansion, high electrical resistivity and high thermal conductivity. The preferred polymer is a polybenzoxazine compound which is filled with particles containing boron nitride. Thermal conductivities as high as 37.5 W/mK were demonstrated based upon the loading concentration of the boron nitride filler. In general the higher the concentration of boron nitride the higher the thermal conductivity of the polymer composite. However, the viscosity of the composite also in creases in direct proportion to the increase in filler concentration. Beyond a certain filler loading, the increased viscosity will cause material processing problems. A molding compound must have adequate fluidity to enable it to be processed into product. Although additives and/or modifiers may be included to improve the flow characteristics of the molding compound they substantially increase cost and may affect other properties such as strength.

SUMMARY OF THE INVENTION

It has been discovered in accordance with the present invention that hexagonal boron nitride can be surface treated to form functional primary and secondary amine linkages at their edge planes which, when coupled to a polymer selected from the group consisting of polybenzoxazine, epoxy resins and novolac or resol type phenolic resins, form a polymer composite of substantially reduced viscosity independent of the boron nitride loading concentration. Stated otherwise, the viscosity of the polymer composite containing a given loading concentration of boron nitride particles surface treated in accordance with the subject invention will be substantially lower than the viscosity of a comparative polymer composite containing filler particles of untreated boron nitride. Moreover, the thermal conductivity of the polymer composite is dependent upon the loading concentration of the boron nitride filler independent of the surface treatment of the boron nitride particles.

The method of the present invention comprises the steps of: treating particles of hexagonal boron nitride with 1,4-phenylene diisocyanate, reacting the treated particles with an aminophenol, combining the so treated hexagonal boron nitride particles with an unreacted monomer selected from the group consisting of benzoxazine, epoxy resins and novolac or resol type phenolic resins to form a composite and polymerizing the composite.

The present invention also relates to a surface treated boron nitride material for use as a filler in forming a low viscosity high thermal conductivity polymer based composite composition with the surface treated boron nitride particles having the formula:

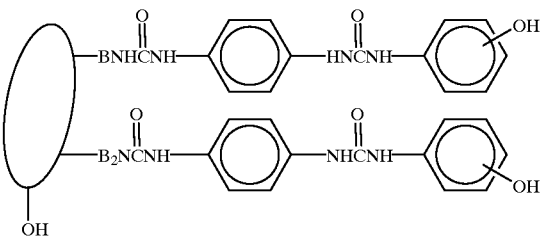

BRIEF DESCRIPTION OF THE DRAWINGS

The advantages of the present invention will become apparent from the following detailed description of the present invention when read in conjunction with the accompanying drawing in which.

DETAILED DESCRIPTION OF THE INVENTION

Figure 1:
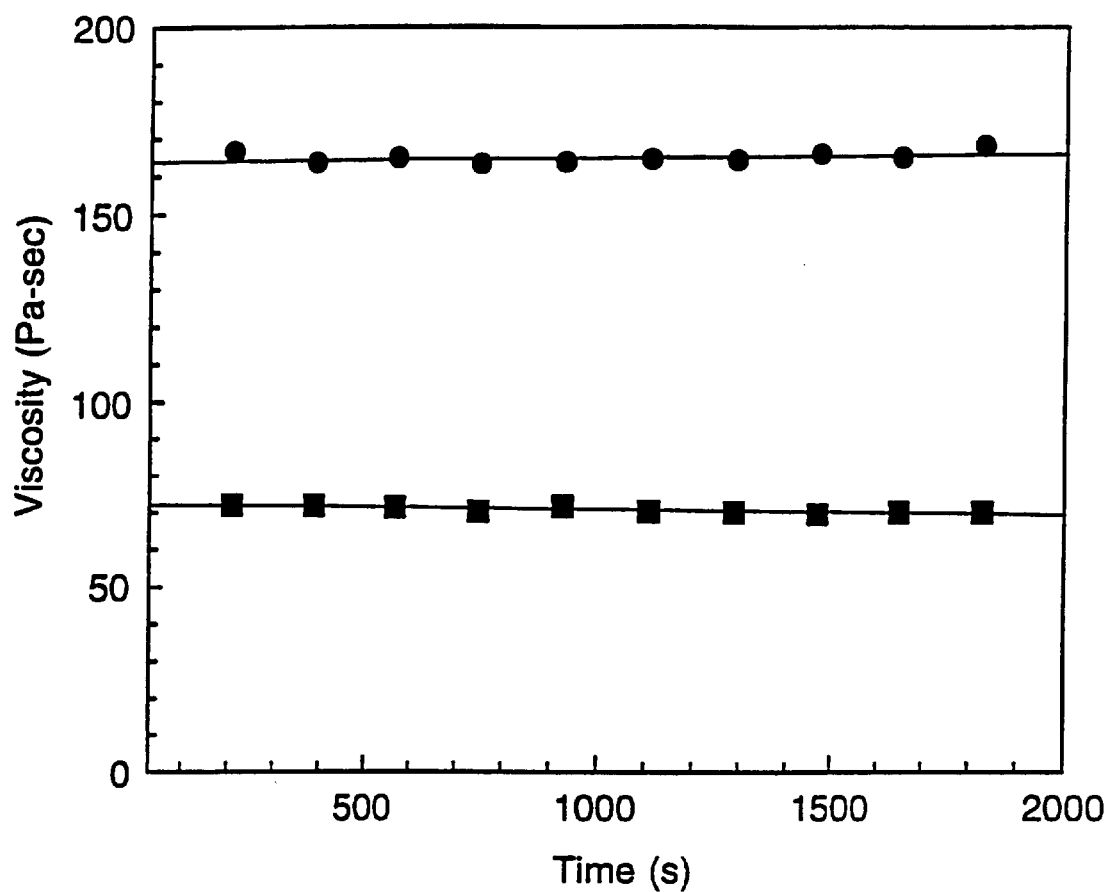
FIG. 1 is a graph showing the comparative relationship between the viscosity at 100° C. of a 30 wt % boron nitride filled polybenzoxazine monomer composition to the same composition with untreated boron nitride.

Graphite is made up of layer planes of hexagonal arrays or networks of carbon atoms. These layer planes of hexagonal arranged carbon atoms are substantially flat and are oriented so as to be substantially parallel and equidistant to one another. The flat parallel layers of carbon atoms are referred to as basal planes and are linked or bonded together in groups arranged in crystallites. Hexagonal boron nitride is similar in morphology to graphite in that both have a flat, plate like shape with molecularly smooth basal planes. However, the edge planes of the boron nitride platelet possess functional amine and hydroxyl groups on its surface.

It has been discovered in accordance with the present invention that the surface chemistry of hexagonal boron nitride particles can be treated to modify the interfacial interaction of the particles so as to cause a coupling between its functional groups and the polymer into which it is loaded.

The surface treatment of the boron nitride particles consist of two steps as shown in the generalized reaction scheme below. In the first step of the treatment an isocyanate group, viz., 1,4-phenylene diisocyanate surface amino groups at the edge planes of the particles to form amine linkages. The second step of the surface treatment preferably occurs immediately after the first step of the treatment to minimize exposure to moisture. In the second step of the treatment the free isocyanate group reacts preferentially with the amine group of an aminophenol viz., 4-aminopenol to form additional amide groups. The reactivity of amino group with isocyanate occurs much faster than with the phenol group. It should be understood that with the large availability of amino functional groups, this surface treatment may incorporate other functional groups as well, such as by substituting a different amino phenol compound in the second step of the treatment For example, they include compounds having the formula:

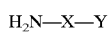

where

X is a linear or branched aliphatic spacer group having from 1 to 40 carbon atoms, or a phenylene group. The phenylene group may be ortho-, meta- or para- substituted by the Y group. Also, other available hydrogen atoms may be substituted to improve the compatibility or reactivity with the matrix resin. These groups include methyl, ethyl, propyl, hydroxyl, nitro, methoxy, ethoxy, phenyl, or another Y group. On occasion, surface treatment of boron nitride may be an attraction option to reduce water content at the filler/matrix interface. Minimization of interaction with the matrix resin my be assisted by having groups such as F or $CF_3$ as substituents for the other available hydrogens.

Y is a functional group which is designed to chemically react or physically strongly interact with the matrix resin. In addition to hydroxyl, those groups include, though they are not limited to, amino, methyleamino, ethyleneamino, amido, thiol, epoxy, vinyl, acetylenyl, silanol, nitrile, carboxyl, methacryl, acryl, allyl, anhydride, cyanate, norbornenyl, and maleimido. The functional group may also include such groups as —$CF_3$, —$CF_2CF_3$, —$CF_2CF_2CF_3$, or other fluorine compounds to minimize the interaction with the matrix resin while adding hydrophobicity to the filler surface.

A generalized reaction scheme of a process of the present invention follows:

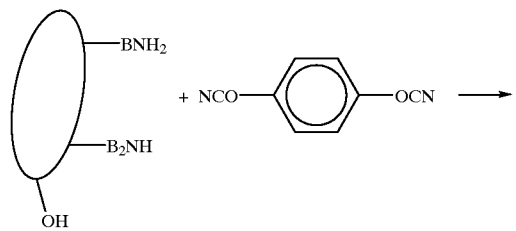

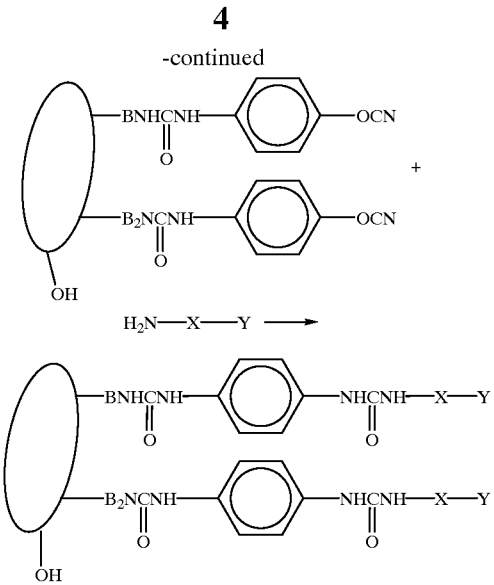

where X and Y are as defined above.

A preferred embodiment of the present invention where, in the second step, an ortho-, meta-, or para-aminophenol is used as one of the reactants, to wit:

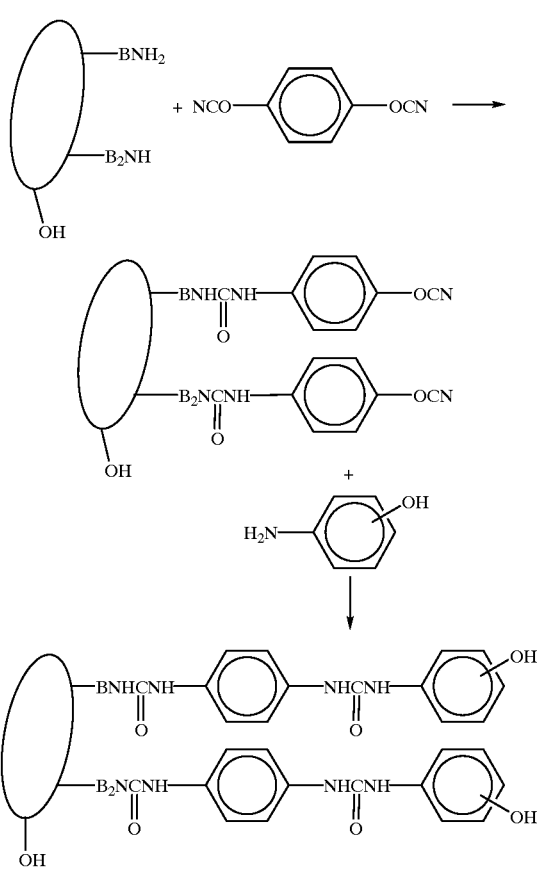

A futher embodiment is one where, in the second step, 4-aminophenol,

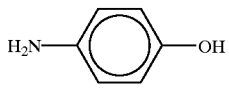

is used as one of the reactants, resulting in a material of the formula

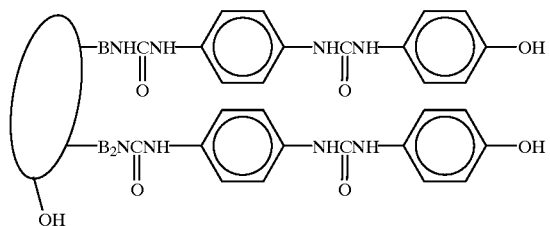

The surface treatment of the boron nitride particles is carried out using tetrahydrofuran (THF) as the preferred solvent. The following is a detailed example of the surface treatment procedure:

Hexagonal boron nitride filler particles ("Polartherm 180") were supplied by the Advanced Ceramics Corporation of Cleveland, Ohio. These ceramic particles have a medium size of 6.8 $\mu$m, a surface area of 16.6 $m^2/g$, and a soluble borate content of approximately 0.2%. The boron nitride particles were first washed prior to use to remove possible residual surface contaminants remaining from the powder processing. For the washing of the boron nitride particles a 2% glacial acetic acid deionized water solution is preferred. The aqueous acetic acid/boron nitride slurry may consist of 7 wt % solids stirred at 85° C. for four hours and then vacuum filtered using a Buchner funnel and Whatman GF/B filter paper. The boron nitride particles may then be washed again with fresh deionized water using twice the volume of water used in the original aqueous acetic acid wash. After the final rinse, the boron nitride filter cake may gently be separated into smaller chunks and dried in air circulating over at 110° C. After one hour, the boron nitride chunks are further separated to a more powdery state and reinserted in an oven overnight. The recovered powder yield from the washing procedure was 98.1%. The washing procedure also resulted in about a 50% reduction in bulk volume due to increased powder packing.

The washed boron nitride particles were added to a three necked reaction flask. The amounts of boron nitride and THF were based on a 8 wt % solids slurry. Approximately ⅓ of the total amount of THF was initially added to the flask. The boron nitride/THF slurry was then stirred with a magnetic stirrer and blanketed with an argon gas purge. Meanwhile, 1,4-phenylene diisocyanate was added to additional THF and stirred and warmed. The amount of phenylene diisocyanate was based on a 0.3 wt % total solution concentration. The 1,4-phenylene diisocyanate solution was then slowly added to the stirring boron nitride slurry. The remaining THF to be added to the slurry was added to the reaction flask which was then transferred to an oil bath, heated and refluxed for 4 hours.

A solution of 4-aminophenol in THF surface was prepared based on a 0.6 wt % total solution concentration. Following treatment with 1,4-phenylene diisocyanate and vacuum filtering, the resultant boron nitride cake was redispersed in fresh THF and a 4-aminophenol solution was slowly added to the boron nitride slurry. The slurry was warmed, stirred for two hours, and then vacuum filtered. Fresh THF was then added over the boron nitride and vacuum filtered. The boron nitride cake was removed, redispersed in fresh THF, stirred, and then vacuum filtered once again. The boron nitride cake was removed, gently separated into chunks, and dried under a hood overnight.

The surface functional groups on these purified hexagonal boron nitride particles consist of primary and secondary amine groups in addition to hydroxy groups. It has been demonstrated in accordance with the present invention that the viscosity of a composite resin system selected from the group consisting of benzoxazine, epoxy resins and novolac or resol type phenolic resins and a filler containing particles of boron nitride can be substantially reduced using surface treated hexagonal boron nitride particles as compared to a similarly filled resin system using untreated boron nitride particles. This is evident in FIG. 1 in which a 30 wt % boron nitride filled BA—a benzoxazine monomer shows a 59% reduction in viscosity relative to an untreated boron nitride filled system at 100° C. The polymerization of the monomer to polybenzoxazine occurs upon application of pressure and/or heat as is well known to those skilled in the art.

In the parent application Ser. No. 08/846457 a composition is taught containing a benzoxazine resin and a filler material which includes particles of boron nitride which permits the boron nitride to be loaded to concentration levels well above 60 wt % and up to 90 wt % for increasing thermal conductivity up to 37.5 W/mk or higher. The advantages of using surface treated particles of hexagonal boron nitride as the filler material permits the loading concentration to be raised without increasing the viscosity of the composite relative to the same composite at the higher loading with untreated particles thereby providing enhanced thermal conductivity and lower viscosity or simply to reduce the viscosity of the filled polymer composite to enhance its processability.

What I claim is:

1. A method for forming a low viscosity high thermal conductivity polymer composite containing particles of hexagonal boron nitride comprising the steps of: (a) treating the surface of the hexagonal boron nitride particles with 1,4-phenylene diisocyanate, (b) thereafter reacting the thus-treated boron nitride particles with a compound of the formula

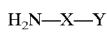

where
X is a linear or branched aliphatic group having from 1 to 40 carbon atoms, or a substituted or unsubstituted phenylene group wherein the substituents are methyl, ethyl, propyl, hydroxyl, nitro, methoxy, ethoxy, phenyl, or another Y group or one or more F or $CF_3$ groups,
Y is hydroxyl, amino, methyleneamino, ethyleneamino, amido, thiol, epoxy, vinyl, acetylenyl, silanol, nitrile, carboxyl, methacryl, acryl, allyl, anhydride, cyanate, norbornenyl, or maleimido and, where applicable, may have additional substituents selected from the group consisting of —$CF_3$, —$CF_2CF_3$, and, —$CF_2CF_2CF_3$, and (c) combining the surface treated hexagonal boron nitride particles with a compound selected from the group consisting of benzoxazine, epoxy resins and novolac or resol phenolic resins and reacting the compound filled with treated boron nitride to form said low viscosity high thermal conductivity polymer composite.

2. A method according to claim 1 wherein, in the compound of the formula $H_2N$—X—Y, X is phenylene and Y is ortho-, meta- or para-OH.

3. A method as defined in claim 1 where the treatment in steps (a) and (b) occurs using tetrahydrofuran (THF) as solvent.

4. A surface treated boron nitride material of the formula:

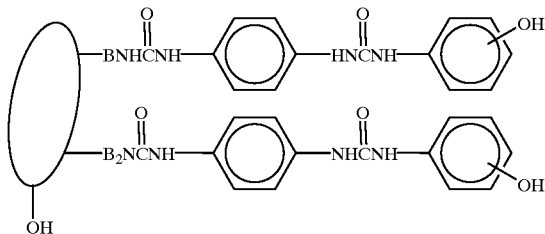

5. A surface treated boron nitride as defined in claim 1 coupled to a polymer selected from the group consisting of polybenzoxazine, epoxy resins and novolac or resol phenolic resins.

6. A composition for use in forming a low viscosity high thermal conductivity polymer based composite comprising a polymer selected from the group consisting of polybenzoxazine, epoxy resins and novolac or resol phenolic resins and a filler material including particles of surface treated boron nitride with the surface treated boron nitride having the following surface treatment schematic representation:

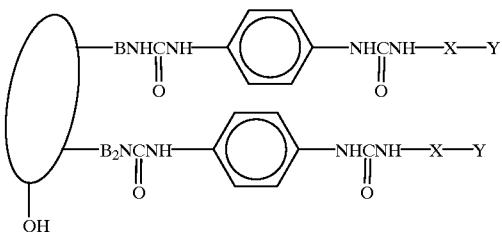

where

X is a linear or branched aliphatic group having from 1 to 40 carbon atoms, or a substituted or unsubstituted phenylene group wherein the substituents are methyl, ethyl, propyl, hydroxyl, nitro, methoxy, ethoxy, phenyl, or another Y group or one or more F or $CF_3$ groups, Y is hydroxyl, amino, methyleneamino, ethyleneamino, amido, thiol, epoxy, vinyl, acetylenyl, silanol, nitrile, carboxyl, methacryl, acryl, allyl, anhydride, cyanate, norbornenyl, or maleimido, and, where applicable, may have additional substituents selected from the group consisting of —$CF_3$, —$CF_2CF_3$, and, —$CF_2CF_2CF_3$.

7. A composition as defined in claim 6 wherein X is phenylene and Y is ortho-, meta- or para-OH.

8. A composition according to claim 7 wherein X is phenylene and Y is para-OH.

* * * * *